United States Patent [19]

McDaniel

[11] 3,836,891

[45] Sept. 17, 1974

[54] TAPE READER SYSTEM WITH BUFFER MEMORY

[75] Inventor: George H. McDaniel, Northville, Mich.

[73] Assignee: The Bendix Corporation, Detroit, Mich.

[22] Filed: July 5, 1973

[21] Appl. No.: 376,484

[52] U.S. Cl. .......... 340/172.5

[51] Int. Cl. .......... G06f 7/00

[58] Field of Search .......... 340/172.5; 235/151.11

[56] References Cited

UNITED STATES PATENTS

| | | | |
|---|---|---|---|
| 3,648,247 | 3/1972 | Guzak | 340/172.5 |
| 3,766,529 | 10/1973 | McLaughlin | 340/172.5 |

*Primary Examiner*—Raulfe B. Zache

*Attorney, Agent, or Firm*—Lester L. Hallacher

[57] ABSTRACT

A tape reader system for numerical control systems including a segmented buffer memory into which characters are read from tape and stored sequentially. One address counter keeps track of "write" addresses and another counter keeps track of "read" addresses. The most significant digits of the two counters are compared to control the writing of fresh data into memory whenever the read address bears other than a selected proximity of the write address.

14 Claims, 12 Drawing Figures

| STOP TAPE IF A-B = 10 | | | | |
|---|---|---|---|---|
| **MOST SIGNIFICANT DIGITS OF "A" COUNTER** ↓ / **MOST SIGNIFICANT DIGITS OF "B" COUNTER** → | 11 | 00 | 01 | 10 |
| 00 | A-B = 01 RUN | A-B = 00 RUN | A-B = 11 RUN | A-B = 10 STOP |
| 01 | A-B = 10 STOP | A-B = 01 RUN | A-B = 00 RUN | A-B = 11 RUN |
| 10 | A-B = 11 RUN | A-B = 10 STOP | A-B = 01 RUN | A-B = 00 RUN |
| 11 | A-B = 00 RUN | A-B = 11 RUN | A-B = 10 STOP | A-B = 01 RUN |
Fig-3
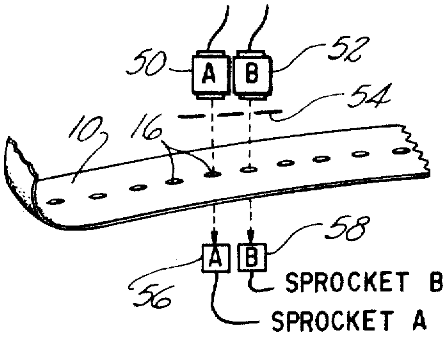
Fig-4
Fig-5
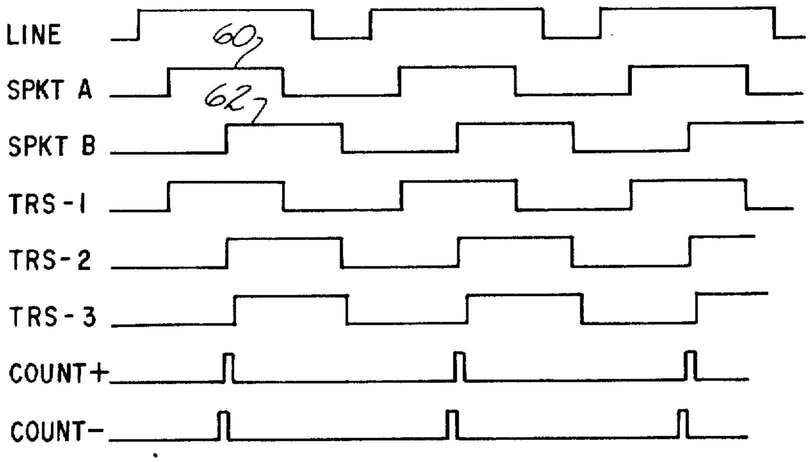

TAPE READER SYSTEM WITH BUFFER MEMORY

INTRODUCTION

This invention relates to tape readers of the type used in numerical control systems and particularly to a tape reader having a buffer storage facility to receive and store numerical control characters from tape and to output characters to the tool directing apparatus, the data input and output rates for the buffer storage facility being regulated so as to provide a predetermined margin of available data at all times.

BACKGROUND OF THE INVENTION

In numerical control systems for carrying out the programmed displacement of a controlled element, such as a machine tool, plotter, or other instrumentality, it is common to employ a punched tape as the input recording medium. In the typical N/C system, the program tape comprises a paper or plastic strip, easily carried on spools, containing a serial or sequential array of eight-bit characters arranged in blocks. A typical block of characters might comprise a character representing the block number so as to facilitate search and identification procedures, several characters representing the directions or displacement coordinates for the controlled elements along each of several axes, a character representing feedrate, a character representing a coolant code, if any, and an "end-of-block" character. The machine tool controller calls for these blocks of characters, one at a time, and directs the controlled element through the displacements indicated by the characters at a rate which is established by the feedrate number and, ultimately, by the physical capabilities of the numerical control system.

The tape reader itself is an electromechanical device in which the characters are sensed by means of an optical readout arrangement. The characters in the punched tape are defined by combinations of up to eight laterally-aligned holes together with a sprocket hole which is smaller than the character bit holes and which is used to drive the tape through the transport mechanism. An optical sensing arrangement is arranged in the fashion of a "read head" across the tape and is responsive to the passage or nonpassage of light through the tape in accordance with whether or not holes are present for the various bit positions of the character being read.

Very stringent mechanical operating parameters have been established for prior art tape readers, since, for accuracy it is necessary that the tape reader stop on each character in the block being read without any significant amount of overshoot and that starting and stopping operations be accomplished without any significant amount of "jitter"; i.e., a vibration-type movement involving rapid forward and reverse components and of such a nature as to give rise to the appearance of a multiple character readout from what is, in fact, a single character. These stringent performance specifications have resulted in correspondingly stringent manufacturing specifications and high costs.

BRIEF DESCRIPTION OF THE INVENTION

In accordance with the present invention, the stringent operating requirements and the resulting high costs of tape readers for numerical control systems are substantially relieved, the result being a tape reader system exhibiting high accuracy, insensitivity to tape jitter and overshoot and other operating advantages, such as forward and reverse tape reading capabilities. In addition, it has been found that the subject tape reader tends to result in a reduction in the number of starting and stopping operations during the reading of a given program tape, thus, resulting in increased service life for the tape transport components.

In general, the advantages of the invention are realized by the addition of a buffer storage facility or memory into which characters from the control tape are read in portions which are typically several blocks long. The memory is capable of outputting characters to the numerical control system controller, a block at a time, and at a rate which is set by the controller as an independent variable; i.e., independent with respect to the rate at which data is read from the tape.

In accordance with the invention, the memory is of finite length, typically long enough to accommodate a relatively large number of numerical character blocks, and is arranged in a serial and continuous fashion whereby characters are written into the memory from a first storage location or address to a last storage location and then directly back to the first location such that both writing and reading operations are carried out in a cyclical or "wraparound" fashion. In addition, the memory is arranged so that writing and reading operations may be carried out at effectively the same time. Therefore, a control means is provided to monitor both written and read character positions at all times so as to control the tape transport in such a way as to maintain a predetermined reserve of numerical control characters in the memory at all times.

In a specific and preferred form of the invention as hereinafter described in detail, the location or address of the last character read into the memory is determined by incrementing a first digital counter and the location of the last character read from the memory is determined by incrementing a second digital counter. In addition, the memory is divided into several sections the addresses within which tend to be mutually distinct; for example, in an illustrative memory having four sections, the two most significant bits of the addresses within those sections are 00, 01, 10, and 11, respectively. The aforementioned control means comprises, in addition to the counters, a count comparison logic network whereby the address count of one counter is continuously compared to the address count of the other counter to ascertain that the last character written bears a certain proximity relationship to the last character read and to control the tape transport mechanism so as to maintain this relationship under all conditions.

Various other features of the invention are disclosed and described in detail in the following specification. These include a read head arrangement including multiple sprocket hole detection, a sprocket error logic detector, and various other features. For the details of these and other features and advantages, reference should be made to the following specification.

BRIEF DESCRIPTION OF THE DRAWINGS

FIG. 3 is a table of comparisons between the two most significant digits of the write and read counter addresses, showing which of the results cause additional transfers from tape to memory;

FIG. 4 is a simplified perspective drawing of a double head sprocket hole detector;

FIG. 5 is a chart of waveforms produced by the sprocket read head and the further apparatus of FIG. 6;

DETAILED DESCRIPTION OF THE SPECIFIC EMBODIMENT

FIG. 1 - BLOCK DIAGRAM

Figure 1:
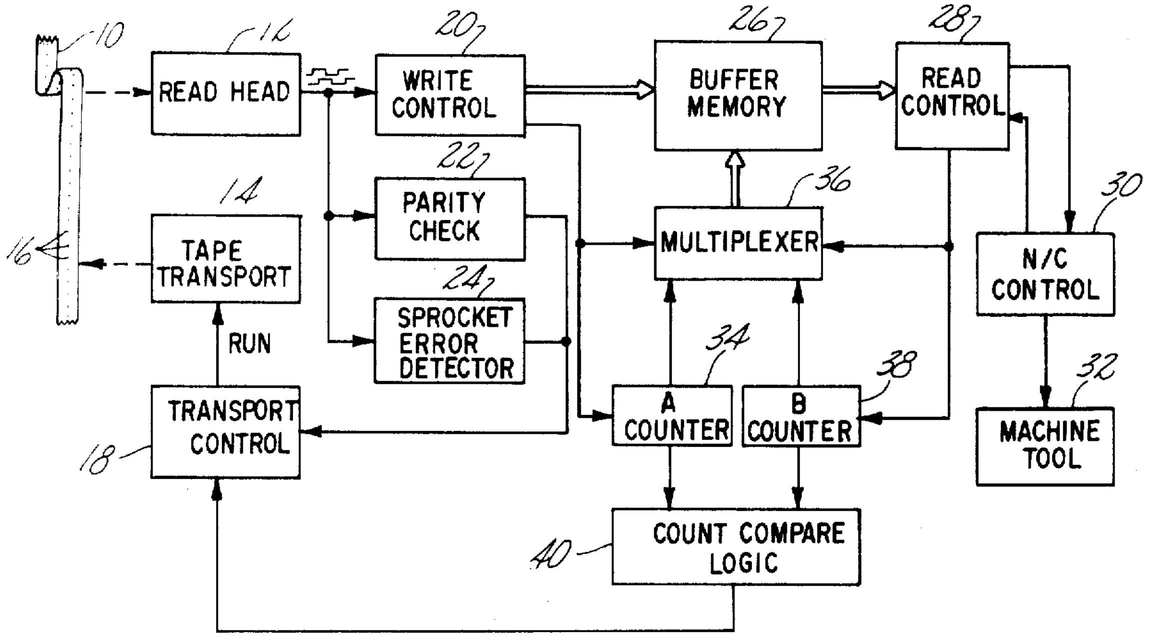
FIG. 1 is a block diagram of a tape reader system embodying the present invention.

In the block diagram of FIG. 1, the illustrative embodiment of the invention is shown to comprise a system for reading data from a numerical control tape 10 in the form of a flexible Mylar strip having a sequentially arranged plurality of eight-digit characters grouped into blocks in accordance with conventional numerical control programming practice. The tape 10 is adapted to be displaced past an electro-optical read head 12, the details of which are hereinafter described, to produce an output signal combination representing the individual characters as they are read and additional output signals representing the detection of a sprocket hole for each character on the tape. The tape 10 is driven by the tape transport mechanism 14 which comprises a conventional drive drum, not shown, having circumferentially spaced, radially extending fingers which engage sprocket holes 16 in the tape 10 for a precision drive. The transport mechanism 14 further comprises a reversible electric motor, not shown, which operates under the control of the transport drive control unit 18 to run in a selected direction whenever characters are to be read from the tape 10.

Data, including both characters and sprocket hole information, read from tape 10 by read head 12 is directed to a write control unit 20 which controls the actual writing of characters into sequentially-arranged locations in the buffer memory 26. Data may also be directed to a conventional parity check unit 22 which ensures that the character code is a "legal" one; alternatively the parity check unit may be connected to receive characters from memory as they are transferred to the controller for the machine tool. Data is also fed to a sprocket error detector unit 24 which detects certain sprocket hole error conditions as hereinafter described. Both the parity check unit 22 and the sprocket error detector 24 produce outputs representing tape error conditions and, hence, are connected to the transport control unit 18 to stop the tape in the event one of several conditions, hereinafter described, obtains.

The write control unit 20, on the other hand, is connected directly into a buffer memory 26 which, in the illustrative example, comprises a random access memory capable of storing up to 256 eight-bit characters in locations which are sequentially addressed for both write-in and read-out operations. As hereinafter described in greater detail with reference to FIGS. 2, 3, and 11, the memory 26 is further divided into four sections having mutually-distinct location address characteristics and which, together with write control unit 20, are arranged to operate in a cyclical or continuous input-output fashion. Accordingly, the characters which are received from the read head 12 are stored in locations having addresses which progress uniformly from a first location to a last location and then directly back to the first location for a cyclical or continuous repeat of the writing and reading operations. Moreover, write-in and read-out operations may be carried out substantially simultaneously and, accordingly, it is necessary to maintain a predetermined relationship between the characters written into the memory 26 and the characters being read out of the memory such that the proper data is read from the memory in the proper order at all times for numerical control purposes.

To this end, the write control unit 20 produces a digital output for each character written into the memory 26, this output being connected to be received by a counter 34 which determines the location or address of the last character written into the memory 26 at all times. This digital signal from the write control unit 20 is also directed to a multiplexer 36 which, in the illustrative example, selects the address stored in the counter 34 whenever characters from tape 10 are to be stored in memory 26. The read-out control unit 28 produces a similar digital output signal quantity for each character which is read from the memory 26 and this signal quantity is directed to a second counter 38 which determines the location or address of the last character read from the memory 26. Again, the signal from read control unit 28 is directed to the multiplexer 36 such that the operations of the counters 34 and 38, also designated in the drawings as counters A and B, respectively, can be carried out in a time-shared fashion. The characters read from memory 26 render control of unit 28 are directed to a conventional N/C system controller 30 which decodes the characters and causes the machine tool 32 to perform the programmed functions.

The counters 34 and 38 are typically implemented so as to maintain a count representing buffer memory storage locations in an eight-digit binary code. These eight-digit counts are compared in an address comparison unit 40 to determine the relative proximity of the last character read from memory to the last character written into the memory. Logic unit 40 produces an output signal which is directed to the transport control unit 18 as a primary run-stop signal to cause the transport unit 14 to read tape whenever the position of a character being read from memory 26 bears other than a preselected proximity to the last character written into the memory 26.

FIG. 2 - MEMORY ORGANIZATION

Figure 2:
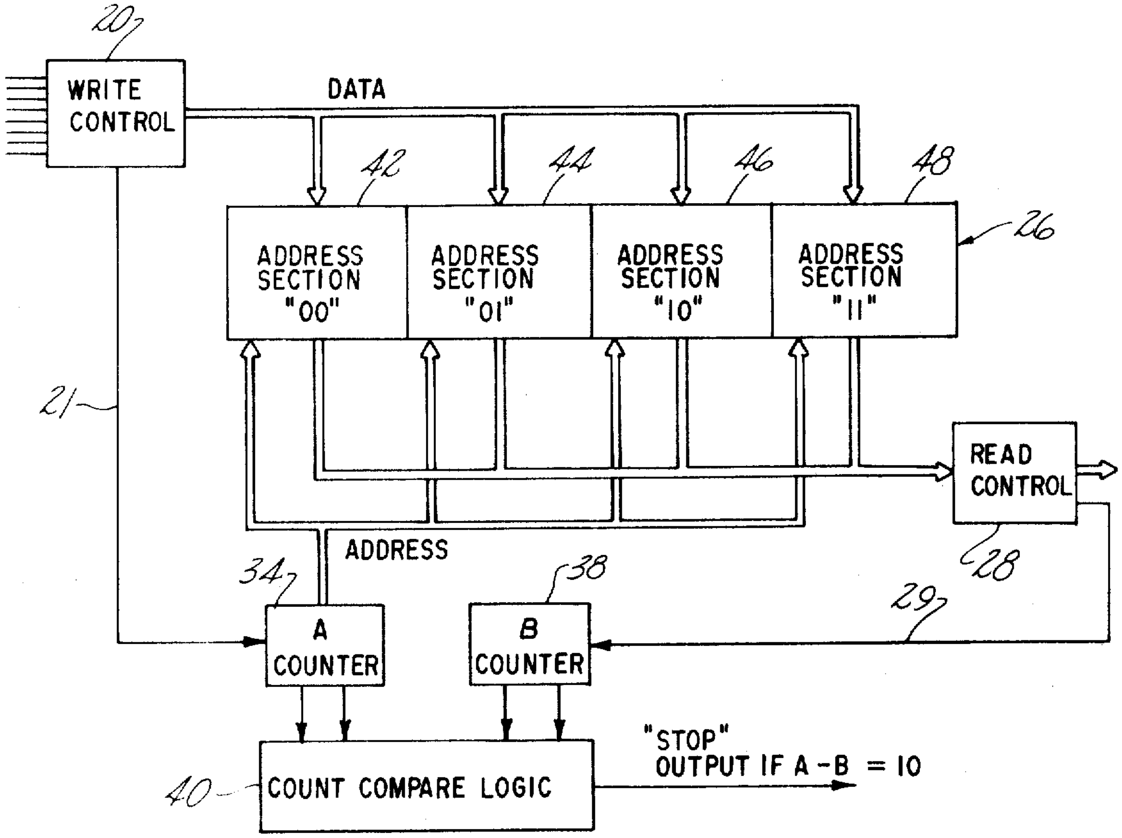
FIG. 2 is a schematic representation of a buffer storage facility or memory which is divided into four sections having distinct location addresses.

Looking to FIG. 2, the basic operation of the counters 34 and 38 and the logic unit 40 in monitoring the respective memory locations of written and read characters in memory 26 is described. In FIG. 2, the memory 26 is shown to comprise four sections 42, 44, 46, and 48, each being of sixty-four characters in length for a total memory capacity or length of two-hundred fifty-six eight-bit characters. The write control unit 20 is capable of writing characters from tape into the memory 26 according to a uniform sequence or progression of storage location addresses, each address being represented by an eight-bit binary code taken from counter 34. The two most significant digits in the address code for all locations in memory section 42 are 00; the two most significant digits for all address locations in section 44 are 01; the two most significant digits for all address locations in section 46 are 10 and; the two most significant digits for all address locations in section 48 are 11.

In the specific system illustrated herein, the first character read from tape 10 is written into the first section 42, the address of the location being represented by the code 00000001; the sixty-fifth character from tape is written into section 44, the address of the location being represented by the code 01000001; the one-hundred twenty-ninth character from tape is written into section 46, at address code 10000001; and the two hundred fifty-fifth character from tape is written into section 48 at address code 11111111. The counter 34 contains these address codes for each of the characters and directs the storage of those characters to the proper locations in memory 26. Once the memory 36 is filled, the two-hundred fifty-seventh character from tape is again written into address 00000001 of section 42. Thus, it can be seen that the writing operation functions in a progressive, but cyclical fashion in the memory 26. Similarly, the sections 42, 44, 46, and 48 are interconnected with the read control unit 28 and the counter 38 such that the reading of characters from memory 26 progresses in exactly the same cyclical fashion, but, in accordance with standard numerical control system operations, is carried out a block at a time. Such blocks may, of course, vary in length from two to twenty or more characters in the typical case.

The partial block diagram of FIG. 2 further shows an output line 21 of the write control unit 20 being connected to the A counter 34 and an output line 29 of the read control unit 28 being connected to the B counter 38. Accordingly, the incremental outputs of the two control units 20 and 28, respectively, simply advance the two-hundred fifty-six bit counters 34 and 38 in accordance with the progress of the write and read address locations being affected at any give time. The contents of the A counter at all times represent the address of the last written character in the memory 26, the eight-bit binary code in the A counter 34 being effective to determine the eight-bit address in which the character is stored in memory 26. The same is true for the contents of the B counter 38, the eight-bit binary number in it is at all times a direct representation of the address in memory 26 of the last character read out of the memory and supplied to the controller 30 of FIG. 1.

As is more fully explained with reference to FIG. 3, the two most significant bits of the number in the A counter 34 are compared with the two most significant bits of the number in the B counter 38 and the difference between the A and B counter is recognized as a control signal for the transport control unit 18. The general proposition followed is that the tape transport unit 14 is stopped if the contents of the A counter minus the contents of the B counter is 10 in binary code. For any other result, the tape transport 14 is caused to run, thus, reading characters from tape 10 into the buffer memory 26 by way of the write control unit 20.

FIG. 3 - READ TAPE LOGIC CONDITIONS

Looking now to FIG. 3, the basic logic requirement on which the embodiment of the invention illustrated in the drawings is based will be explained in detail. The basic requirement is that the character being read from memory 26 must be in the second address section behind the character which was last written into the memory; stated another way, the character last written into the memory must be a sufficient distance (measured in characters) ahead of the last character read to ensure that at least the next full block of characters may be read from memory upon request from the controller 30 without running past the freshly-written characters from tape 10. In this regard, it is to be noted that memory 26 is preferably fabricated in such a way as to permit new data to be written directly over old data; that is, the only way the contents of the memory are changed is by writing new data into storage locations which are occupied by old data. This avoids the need for any clearing capability or data erasing instrumentalities.

The basic spacing requirement set forth above gives rise to the logical requirement set forth in FIG. 3 that tape 10 will be read into memory 26, if the first two digits of the A counter equal the first two digits of the B counter indicating that the read and write characters are in the same address section; if the A counter digits are equal to the B counter digits plus one full section, thus, indicating that the last character written is in the next section ahead of the last character read; or if the A counter digits are equal to the B counter digits less one full section, indicating that the last character read is in the section directly ahead of the last characher written. Recalling that the memory 26 operates in a continuous wrap-around fashion, it can be seen that this basic logical requirement meets all conditions even if the A counter "turns the corner" from the last address location to the first address location and, thus, appears from an absolute count standpoint to be behind the B counter.

The logical requirements set forth above is easily implemented by comparing the two most-significant digits of the A counter address to the two most-significant digits of the B counter address. In the table of FIG. 3, it can be seen that when the last character read from memory is in address section 48 of memory 26 and, thus, the two most significant digits of the number in the B counter are 11 there exists a need to read tape 10 to enter fresh data into memory 26 if the last character written is in either sections 42 or 46. If the last data written is in section 44, the basic logical requirement is satisfied and it can be safely assumed that the next block can easily be read from memory 26 without going past the end of the fresh or current data. Looking up the lefthandmost column in FIG. 3, the result of the subtraction process between the two most-significant digits of the A and B counters produces a result of 10 only when the last character written is in section 44; i.e., the two most significant digits of the A counter are 01. There is no need to read more tape 10 into memory 26 under these conditions. For all other answers, 01, 11, and 00 the tape transport mechanism 14 is caused to advance tape 10 to read additional data into memory 36, advancing counter 34 until the logical condition is satisfied. As an example, it can be seen that advancing from section 42 to 44 in the A counter advances the result of the A–B subtraction process from 01 to 10 and accordingly, as soon as this condition is satisfied, the tape transport unit 14 is stopped.

The same analysis is followed for the second column from the left in FIG. 3 which shows the table of possible conditions when the two most significant digits in the B counter are 00 indicating that the last character read from memory 26 is in the address section 42. From our previous requirements, it is understood that tape will be read unless the A counter shows that the last character written is in section 46 and, thus, the A counter has 10 for its two most significant digits. Similar analyses apply to B counter numbers which have 01 and 10 for the two most significant digits thereof, the resulting indicating that the relationship A − B = 10 represents the "tape stop" condition for all values of the independent variables B.

It is to be understood that the four-section memory and the analysis and implementation of this analysis set forth above is largely by way of example, although it does represent the best mode of practicing the invention known at the time of filing the patent application. This implementation has the advantage of presenting the same criterion for reading tape in both directions. It will, however, be apparent to those skilled in the art that other equivalent embodiments and implementations are possible.

FIG. 4 - SPROCKET READ HEAD

Referring now to FIG. 4, an important aspect of the tape reading unit 12 is shown in detail. The apparatus of FIG. 4 is that part of the tape read head 12 which detects the sprocket holes 16 in the tape 10 for the purpose of ensuring that the tape is advancing from character to character under the control of the tape transport unit 14. The unit of FIG. 4 also produces an output from which very important information regarding tape direction is derived. In FIG. 4 the sprocket reading assembly is shown to comprise separate light sources 50 and 52 in the form of light emitting diodes spaced along the longitudinal direction of the tape 10 and focused on the sprocket hole track of tape 10 through a double aperture mask 54. No "character" holes are shown in FIG. 4, but those familiar with N/C tapes will appreciate that character holes are arranged in lateral rows of up to eight bits per row, the sprocket holes 16 being centrally disposed between and aligned laterally with the character holes. Light detectors 56 and 58 are disposed on the opposite side of the tape in such a position as to receive light transmitted from the sources 50 and 52, respectively, as the sprocket holes 16 permit such light transfers to occur. With the tape moving from left to right in FIG. 4, it can be seen that sensor 56 develops the sprocket A signal 60 in FIG. 5 while sensor 58 develops the sprocket B signal 62 on the third line of FIG. 5, the two signals being similar rectangular waveforms, but with the sprocket B signal shifted in phase by 90° relative to the sprocket A signal.

FIGS. 5 & 6 - WRITE CONTROL

Figure 6:
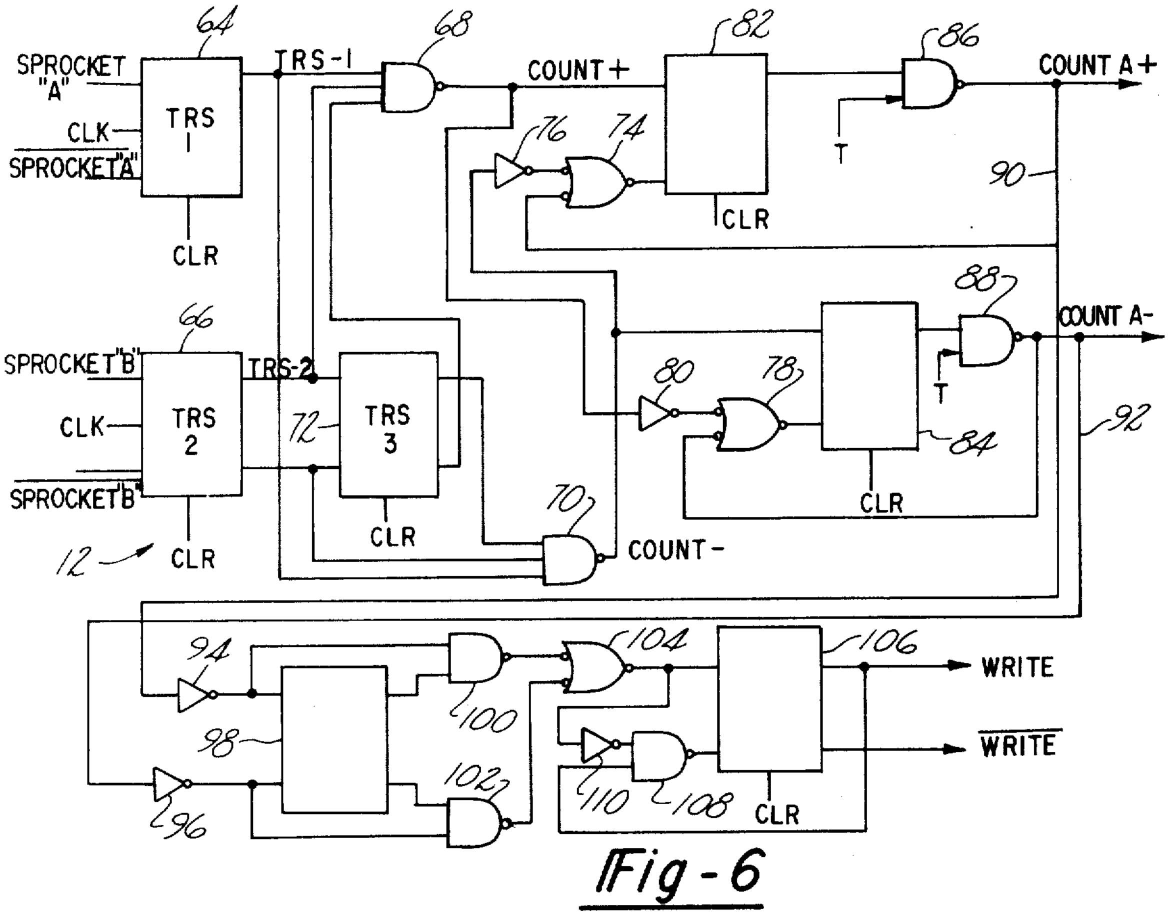
FIG. 6 is a schematic logic diagram of a part of the write control unit of FIG. 1.

Looking now to FIGS. 5 and 6, a portion of the write control unit 20 of FIG. 1 is shown in schematic logic diagram form. The direction with which the tape 10 is moved past the read head 12 by the transport unit 14 is, of course, all important in determining the locations in memory where the characters being read are stored as well as maintaining the proper count in the A counter 34. To maintain this information in the proper order, the sprocket A and sprocket B signals and the complements of those signals are applied to clocked flipflops 64 and 66 in the order indicated by the drawing legends. The 1 output of flip-flop 64 is connected to the inputs of gates 68 and 70 and is identified in FIGS. 5 by TRS-1. Similarly, the 1 output of flip-flop 66, also identified in FIGS. 5 and 6 as TRS-2 is connected to the other input of gate 68 and also to the input of a third flip-flop 72. The output of flip-flop 72 is delayed by one clock time with respect to TRS-2, but is otherwise of the same waveform. The one output of flip-flop 72 is also connected as an input to gate 70. The third input to gate 68 comes from the 0 output of flip-flop 72 and the third output to gate 70 comes from the 0 output of flip-flop 66. The output of gate 68 is connected first to the 1 input of flip-flop 82 to store in that flip-flop a positive count signal so that such signal is available for later operations should a read operation be commanded by the multiplexer unit 36 at the time a positive count signal is outputted from gate 68. The output of gate 70 is connected to the 1 input of flip-flop 84 to store a minus count signal for use when a write operation takes place. The outputs of gates 68 and 70 are also inverted in inverters 80 and 76, respectively, and connected through gates 74 and 78, respectively, to the opposite or 0 inputs of flip-flops 82 and 84. The outputs of the flip-flops 82 and 84 are connected through gates 86 and 88 to the A counter 34 of FIG. 1 to cause positive and negative counts, respectively, to take place in counter 34.

The outputs of gates 86 and 88 are also employed as inputs to a flip-flop 98 which prevents an erroneous write operation into memory whenever the tape 10 reverses direction; i.e., the first negative A count after going positive does not cause a write operation and vice versa. To accomplish this, the signals from gates 86 and 88 are connected through inverters 94 and 96, respectively, to opposite inputs of the flip-flop 98. The output of inverter 94 along with the 1 output of flip-flop 98 are connected as inputs to an inverting AND gate 100 while a similar connection is made through the 0 output of flip-flop 98 to gate 102. The outputs of the gates 100 and 102 are connected as inputs to an inverting OR gate 104, the output of which is connected directly to flip-flop 106 and through inverter 110 and gate 108 to the 0 input of flip-flop 106. The 1 output of flip-flop 106 represents a write signal and is transferred to memory 26 through the read-write timing control apparatus disclosed in FIG. 9.

FIG. 7 - SPROCKET ERROR DETECTOR

Figures 7, 9:
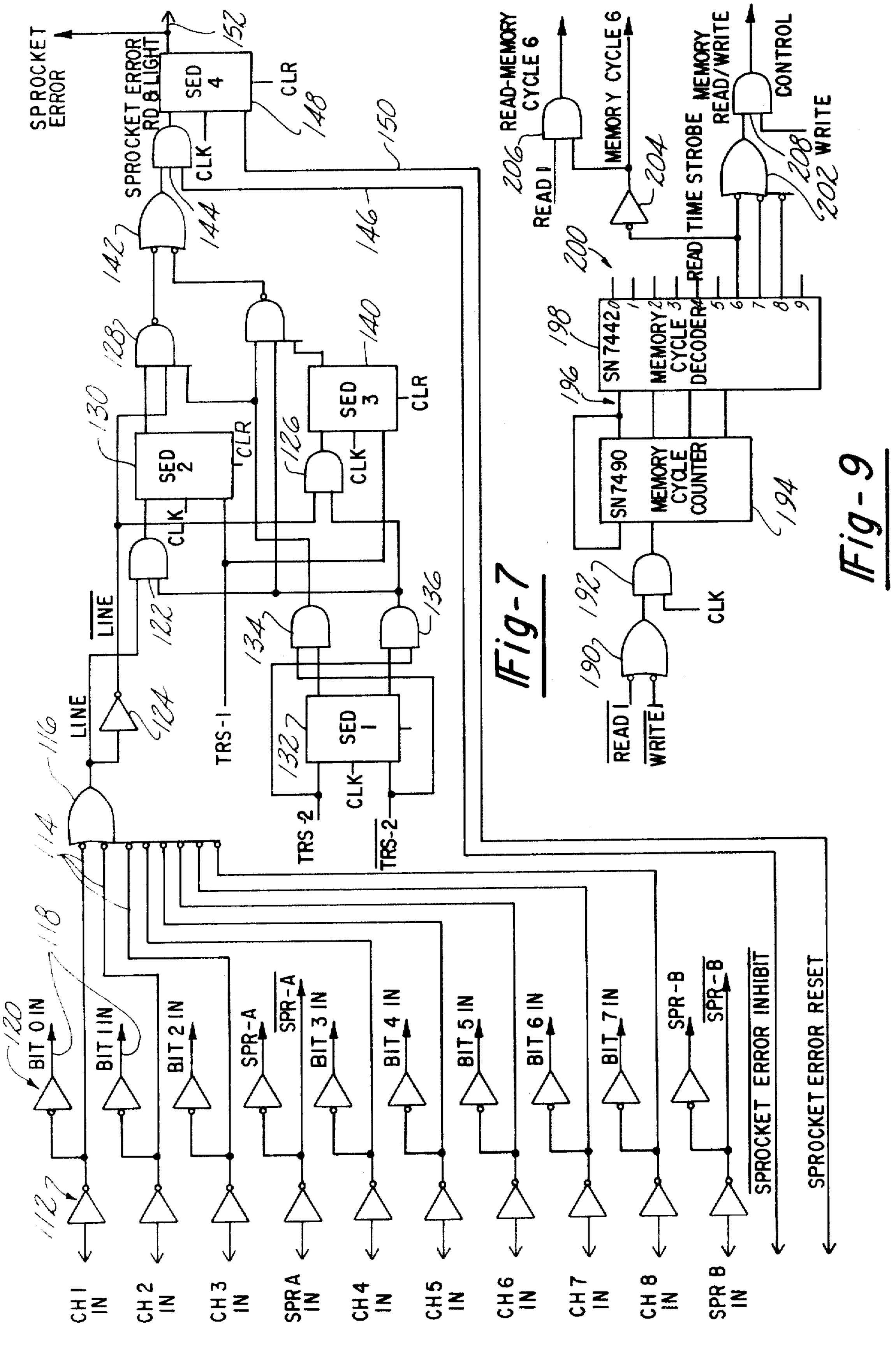
FIG. 7 is a schematic logic diagram of a sprocket error detector circuit.
FIG. 9 is a schematic diagram of a timing circuit for the system of FIG. 1.

FIG. 7 is a logic diagram of the sprocket error detector unit 24 of FIG. 1 and comprises a parallel combination of 10 inverter units 112 connected to receive the eight character digits and the two sprocket signals from the read head 12 of FIG. 1. The outputs of the inverters 112 for the eight channels of character bits are connected by way of lines 114 as inputs to OR gate 116 while the same outputs are connected by way of output lines 118 to the memory 26 for the storage of data, as schematically shown on FIG. 11. It will be noted that inverters 120 appear in the lines 118 to reinvert the channel data to the original state.

The uninverted output of OR gate 116 is the "line" signal represented on the top line of FIG. 5 and is connected as one input to an AND gate 122. The output of gate 116 is further connected through an inverter 124 to produce a $\overline{\text{line}}$ signal which is connected as an input to both gates 126 and 128. The TRS-1 signal derived from flip-flop 64 of FIG. 6 is connected as a 0 input to a flip-flop 130 while the output of gate 122 is connected as the 1 input of that flip-flop. The TRS-2 signal derived from flip-flop 66 of FIG. 6 and shown on line 5 of FIG. 5 is connected as a 1 input to a flip-flop 132 while $\overline{\text{TRS-2}}$ is connected as the 0 input to same flip-flop 132. The 1 output of flip-flop 132 is connected through gate 134 along with the $\overline{\text{TRS-2}}$ signal while the 0 output of flip-flop 132 is connected to a gate 136 along with the TRS-2 signal. The output of gate 134 is connected commonly as inputs to gates 128 and 138 while the output of gate 136 is connected commonly to the inputs of gates 122 and 126. The output of gate 126 is connected to the input of a flip-flop 140 while the TRS-1 signal is connected to the 0 input of flip-flop 140. The 1 output of flip-flop 140 is connected at the third and final input to gate 138.

The outputs of gates 128 and 138 are connected through a gate 142 to an AND gate 144 which also receives a sprocket error inhibit "not" signal on line 146 for normal operation. This signal is typically generated by a suitable control panel switch, not shown. The output of gate 144 is connected to the 1 input of a flip-flop 148 while the opposite input is connected to receive a sprocket error reset signal on line 150. The 1 output of flip-flop 148 is shown on line 152 to represent a sprocket error condition.

The logic diagram of FIG. 7 represents the implementation of the following set of circumstances given with respect to the waveforms of FIG. 5 to represent a sprocket error condition: if sprocket B goes positive during one state of line and goes negative in the opposite state of line without sprocket A having been positive, a sprocket error exists. It can be seen that this logic condition satisfies both forward and reverse movements of the tape 10.

FIG. 8 - READ CONTROL

Figure 8:
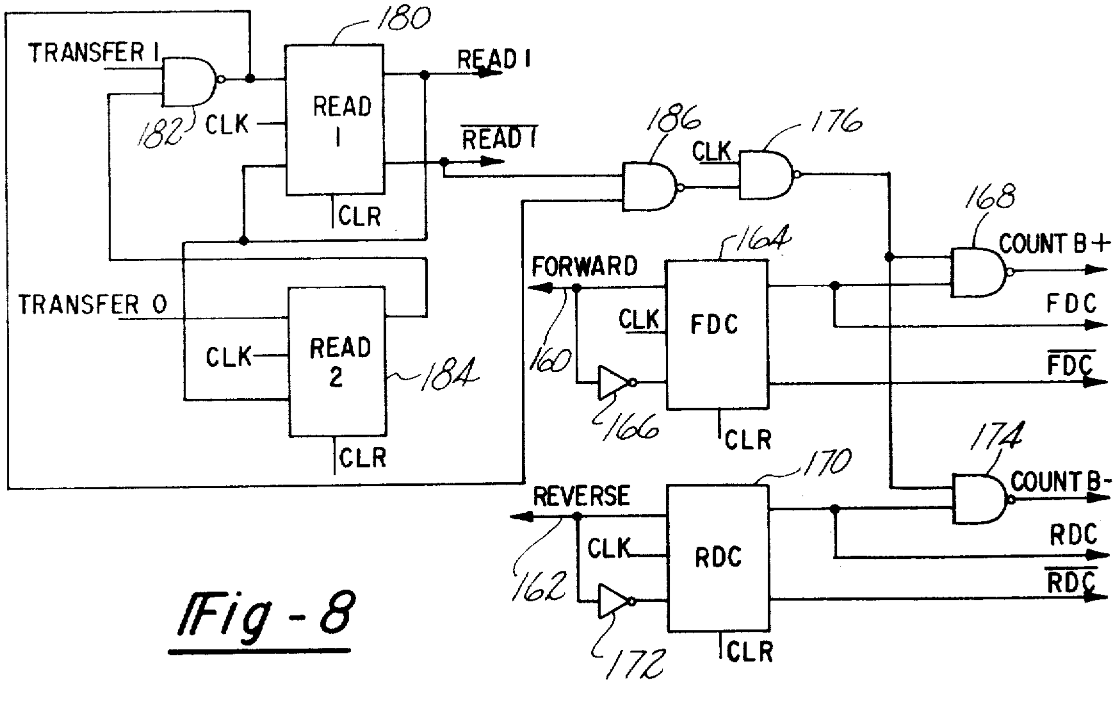
FIG. 8 is a schematic logic diagram of a portion of the read control unit of FIG. 1.

Looking now to FIG. 8, the logic diagram of part of the read control unit 28 is shown. FIG. 1 indicates that the controller 30 receives information from the read control unit 28 in the form of blocks of characters and also indicates that the controller communicates to the read control unit 28 the need for additional part program data. In FIG. 8 this communication of the need for additional data is shown to comprise signal lines 160 and 162 which carry forward and reverse signals, the forward signal on line 60 representing the need for the advance of the tape reader system to provide an additional block of information or data to the controller 30. The reverse signal on line 162 indicates the need to back up; this condition may exist where a sprocket error is detected, where a rewind code is encountered or when a block number search is being conducted. In both forward and reverse operation, it is necessary to properly increment the B counter 38. This is accomplished by connecting the forward signal directly to the 1 input of a flip-flop 164 and through an inverter 166 to the 0 input of flip-flop 164. The 1 output of flip-flop 164 is connected through a gate 168 to represent on the output thereof a positive increment in the B counter 38. The 1 output of flip-flop 164 is also represented by the legend FDC and is used in the circuit of FIG. 10, hereinafter described. Similarly, the 0 output of flip-flop 164 is also employed in the circuit of FIG. 10 which ensures that the 0 output of flip-flop 164 is also employed in the circuit of FIG. 10 which ensures that the information transfer to memory and from memory to the controller 30 takes place in the proper order regardless of positions of the B and A counters.

For a reverse condition, the signal on line 162 is connected through a flip-flop 170 in exactly the same fashion as is the flip-flop 164; i.e., the reverse signal is connected directly to the 1 input of flip-flop 170 and through an inverter 172 to the 0 input. The 1 output of flip-flop 170 is connected through a gate 174 along with a clocked transfer signal from gate 176 such that the output of gate 174 represents the negative increment to be applied to the B counter during the reverse movement. The clocked transfer signal from gate 176 is also applied to gate 168.

Figures 10, 12:
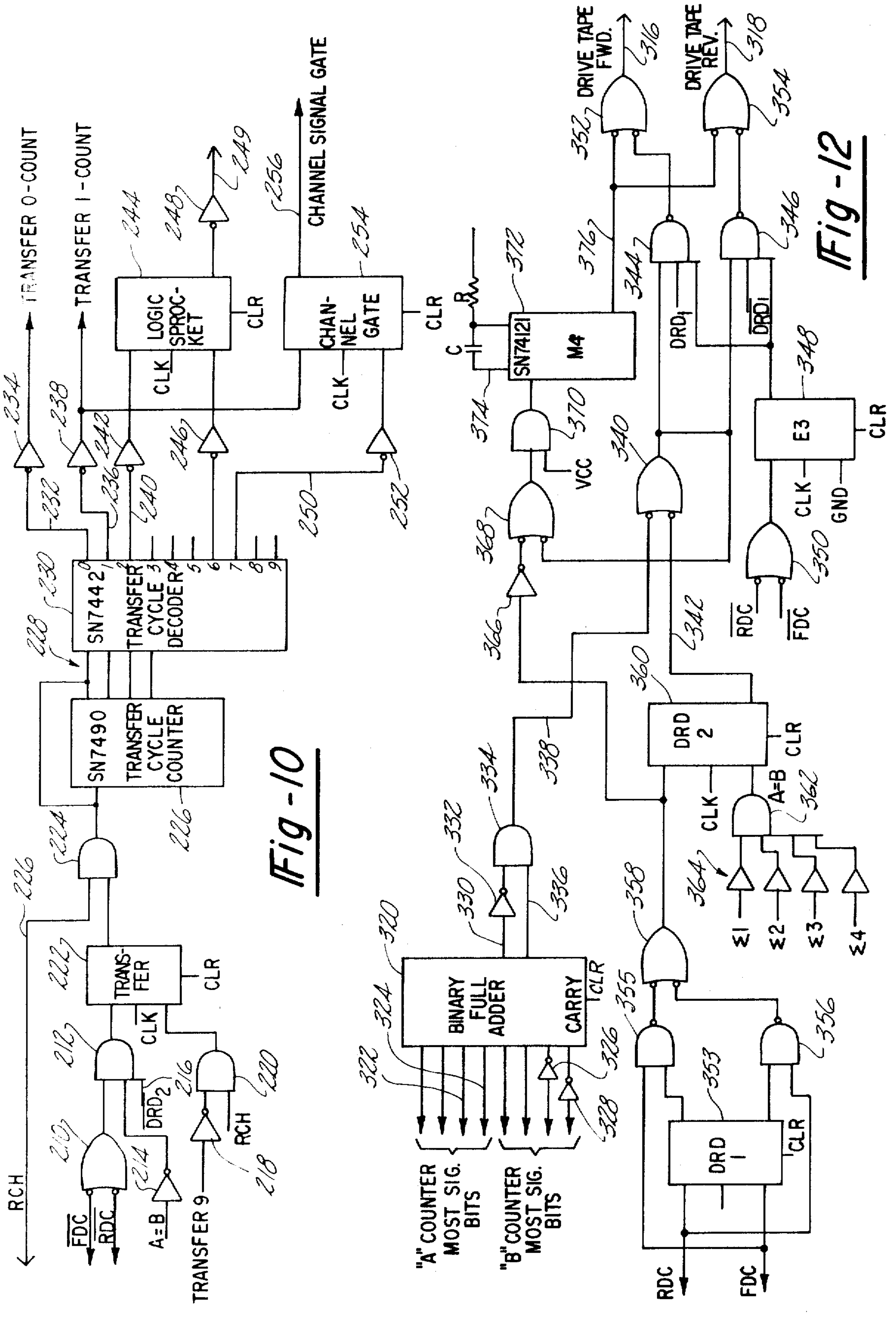
FIG. 10 is a schematic diagram of a second portion of the read control unit of FIG. 1.
FIG. 12 is a schematic diagram of the tape transport control unit of FIG. 1.

Timing signals generated by the logic system of FIG. 10 are also applied to the circuit of FIG. 8, the Transfer 1 signal being applied to a flip-flop 180 at clock time 1 through a gate 182 and the Transfer 0 being applied to a flip-flop 184 at clock time 0. Clock signals in this case are 3 MHz for the basic clock signal and 300 KHz for the clk/10 signal. The 1 output of flip-flop 180 is the read 1 signal and is connected back to the 0 input of flip-flop 180 and also to the 0 input of flip-flop 184. The 0 output of flip-flop 180 is the $\overline{\text{read 1}}$ signal and is connected to the gate 186 to be ended with the output of gate 182, the result being connected to the gate 176 to be clocked as an input to gates 168, 174.

FIG. 9 - MEMORY CYCLE CONTROL

Figure 11:
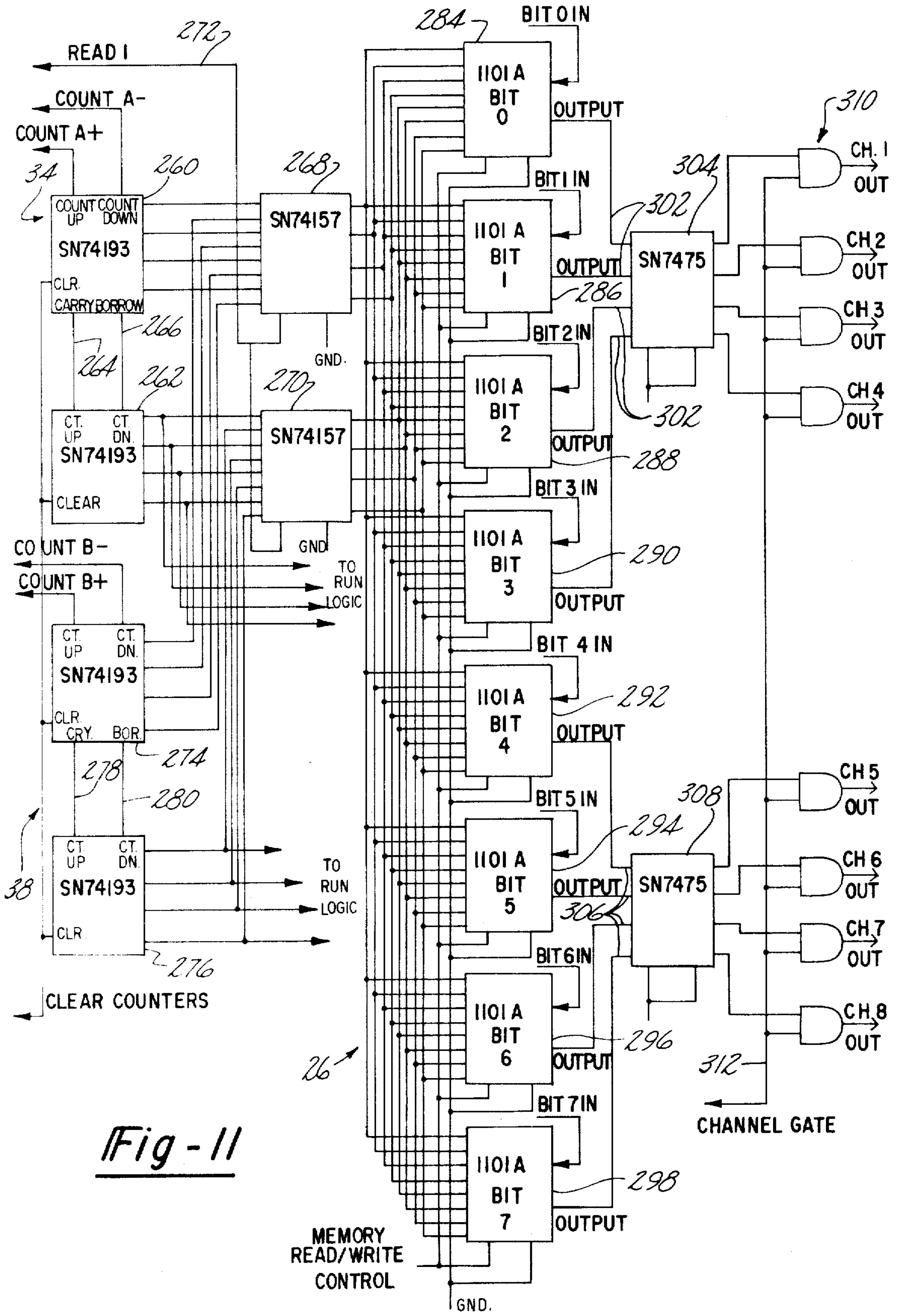
FIG. 11 is a schematic diagram of the memory of FIG. 1.

Looking now to FIG. 9, this logic diagram represents the memory cycle control which provides read and write timing pulses to the memory 26 also disclosed in greater detail in FIG. 11. Looking to FIG. 9, the $\overline{\text{read 1}}$ and $\overline{\text{write 1}}$ signals from the circuits of FIGS. 8 and 6, respectively, are connected through OR gate 190 to an AND gate 192 which also receives a clock signal so as to clock the OR'd combination of $\overline{\text{read 1}}$ and $\overline{\text{write 1}}$ to a memory cycle counter 194. Counter 194, together with memory cycle decoder 198, establishes a memory cycle of ten clock times for each read and write operation, the constant frequency clock signal being derived by suitable frequency reduction of a crystal oscillator signal in the conventional fashion and applied to the clock input of gate 192.

Memory cycle counter 194 goes through ten clock times and produces a binary coded decimal (BCD) output on lines 196 whereas the decoder 198 converts to decimal and, thus, produces ten successive output signals on output lines 200, also numbered zero through nine. At clock time six a strobe signal is applied to one input of gate 202 and, through an inverter 204 to an input of gate 206. The read 1 signal from flip-flop 180 of FIG. 8 is also applied to gate 206 to produce a composite output signal identified by the legend read 1 memory cycle 6. Gate 202 is also connected to receive the outputs from the BCD to decimal decoder 198 appearing on clock time outputs 7 and 8 and, thus, gate 202 produces an output equal to three clock times.

This output is applied to the input of AND gate 208 along with the write signal to produce a memory read/write control signal output which is applied to the random axis memory 26 shown in FIG. 11.

FIG. 10 - READ TRANSFER TIMING

FIG. 10 discloses the logic diagram of the portion of the read control unit 28 which effects the transfer of characters to the controller 30 in such a way as to render the tape reader system of the present invention completely compatabile with N/C controllers designed and constructed for use in connection with prior art tape readers.

In FIG. 10, OR gate 210 is connected to receive the $\overline{FDC}$ signal from flip-flop 164 of FIG. 8 and the $\overline{RDC}$ signal from flip-flop 170 of FIG. 8. The output of gate 210 is connected as one input to AND gate 212, the other inputs to AND gate 212 include a signal from inverter 214 whenever the A counter 34 contains the same absolute address as the B counter 38 and a $\overline{DRD_2}$ signal on line 16 from the circuit of FIG. 12, hereinafter described. Gate 212 operates to prevent transferring any information from memory to the controller 30 if the B counter address is about to go ahead of the A counter address. This, of course, might indicate a malfunction. The output of gate 212 is connected to the one input of a transfer timing flip-flop 222. The other or zero input of flip-flop 222 comprises the output of AND gate 220 the inputs to which include a ninth clock time signal from decoder 198, after inversion in inverter 218, and the RCH signal, a timing signal which occurs every one-hundred clock times. The 1 output of flip-flop 222 along with the RCH timing signal on line 226 are applied as inputs to AND gate 224 to increment a transfer cycle counter 226. The cycle counter 226 is implemented in exactly the same form as the counter 194 to produce a BCD output over ten transfer cycle clock times, the signals appearing on lines 228. Lines 228 are connected to the decoder 230 which again is identical to decoder 198 of FIG. 9 to produce the decimal equivalent of the ten transfer clock cycle times.

As shown in FIG. 10, the outputs of the decoder 230 are ten in number and the $\overline{0}$ output on line 232 is connected through inverter 234 and applied to the B counter control circuit shown in FIG. 8; i.e., as an input to flip-flop 184. The $\overline{1}$ output of decoder 230 as the Transfer 1 count signal applied to AND gate 182 in the B counter control circuit of FIG. 8. The 2 transfer cycle timing signal appears on output line 240 and is applied through inverter 242 to the 1 input of a logic sprocket flip-flop 244. The flip-flop 244 is preset by the $\overline{6}$ output from decoder 230 after being applied to the inverter 246. The 0 output of flip-flop 244 is connected to inverter 248 as a simulated sprocket signal which is applied to the controller 30 just as a conventional sprocket signal would be applied to the controller from a standard tape reader. The sprocket signal from inverter 248, like a conventional sprocket signal, is of a lesser time duration than the data channel signals.

The $\overline{7}$ signal from decoder 230 appears on output line 250 and is applied through inverter 252 to the 0 input of channel gate flip-flop 254. The 1 input of flip-flop 254 is connected to the output of inverter 238 so as to receive the 1 timing signal from decoder 230. Accordingly, the duration of the output signal on the 1 output line 256 of flip-flop 254 is of greater length than the simulated sprocket signal which appears at the output of inverter 248.

In brief, the circuit of FIG. 10 is effective to provide three major functions: one, the delay of any data transfer signal should the B counter be about to go ahead of the A counter; two, the provision of a ten period transfer timing cycle; and, three, the generation of a simulated sprocket signal and a channel gate signal on lines 249 and 256, respectively.

FIG. 11 - MEMORY AND ADDRESS COUNTERS

FIG. 11 is a complete schematic and logic circuit diagram for a suitable implementation of the memory 26, the A counter 34 and the B counter of FIG. 1. In addition, a portion of the multiplexer unit 36 is shown as it relates to the multiplexing of the addresses in the counters 34 and relating to the data in memory 26.

In FIG. 11 the A counter 34 is shown to comprise two four-bit binary counter sections 260 and 262 connected by carry and borrow lines 264 and 266, respectively. Counter section 260 is connected to receive the count A+ and count A− signals from gates 86 and 88 of FIG. 6 such that the combination of the sections 260 and 262 represents the eight-bit address of the character currently being written into the memory 26. The four least-significant bits are connected from section 260 to an address multiplexer section 268 while the four most-significant bits of the address in the A counter are connected to a second multiplexer section 270. Each of the multiplexer sections 268 and 270 is an eight-bit switch device having two selectible transfer modes, the transfer of data from the A counter 34 being the normal mode and the transfer of data from the B counter 38 being selected by application of a positive voltage to the read 1 input line 272.

The B counter 38 similarly comprises two four-bit binary counter sections 274 and 276, the four least-significant digits being stored in section 274 and the four most-significant digits being stored in section 276 by virtue of the carry and borrow connection lines 278 and 280, respectively, which are connected between the two counter sections. The count B− and count B+ signals from gates 174 and 168 of FIG. 8 are applied to the count down and count up inputs of counter section 274, such that the content of the counter 38 is at all times an eight-bit binary coded address representing the address of the character currently being read from memory 26 and applied to the controller 30.

The eight output lines of the counter 38 are connected to the multiplexer sections 268 and 270 along with the eight output lines of the A counters 34. Again, the read 1 signal on line 272 selects the B counter signal for transfer to the memory during the first read clock cycle time as established by flip-flop 180 of FIG. 8.

Memory 26 comprises eight channel sections 284, 286, 288, 280, 282, 294, 296, and 298 representing the eight channels of data making up the characters on tape 10. Each section is two hundred fifty-six bits in length thereby to receive and store for later retrieval one bit representing one channel of each of two hundred fifty-six successive characters read from tape 10. As previously described, the memory sections are preferably of the random access type wherein new data may be written directly over old, thus, giving rise to the cyclical memory operation, previously described. It should be noted that the channel sections of FIG. 11 do not correspond to the address sections 42, 44, 46, and 48 of FIG. 2. Rather, each channel section is effectively divided into the four address sections for purposes of monitoring the written and read characters.

As shown in FIG. 11, each of the memory sections 284 through 298 is connected to eight address lines 300 from the counters 34 and 38 by way of the multiplexer sections 268 and 270. In addition, each of the memory sections is connected to receive a character bit from a separate tape channel by way of lines 118 of FIG. 7; memory section 284 receives the zero channel bit for storage at the address selected on line 300; memory section 286 receives the one channel bit for storage at the same address; section 288 receives the two channel bit for storage at the same address, and so forth. Since all eight sections of the memory 26 receive the same address at any given time, it is clear that all eight bits from a given character are stored at the same address or read from the same address, depending on the state of the multiplexer sections 268 and 270.

Each of the memory sections 284, 286, 288, and 290 has an output line 302 connected to the input of a character bit latch or buffer unit 304 which is loaded upon occurrence of the read 1 · memory cycle 6 from gate 206 of FIG. 9. Similarly, the output lines 306 of memory sections 292, 294, 296, and 298 are connected to a similar latch or buffer unit 308 which is loaded upon the occurrence of the read 1 · memory cycle 6 signal. Accordingly, the eight character bits are fed through gates 310 to the control unit 30 upon the occurrence of the channel gate signal on line 312. It will be recalled that the channel gate signal is generated by the read control unit 28, as was specifically described with reference to FIG. 10.

FIG. 12 - TRANSPORT CONTROL

FIG. 12 shows in schematic logic circuit form the details of the transport control unit 18 of FIG. 1. By way of introduction, it will be noted that the circuit of unit 18 produces two outputs, a drive tape forward output which appears on line 316 and a drive tape reverse signal which appears on output line 318. These signals are applied to the tape transport drive motor circuit to advance, rewind, and stop the tape as needed.

In FIG. 12, the two most significant digits of the address in the A counter 34 are applied to a binary adder circuit 320 via lines 322 and 324. The two most significant digits of the B counter address are inverted by inverters 326 and 328 and applied to the adder 320 to determine the quantity A – B in accordance with the rules set forth in FIG. 3. The two most significant bits of the adder output appear on lines 330 and 336. Line 330 is connected through inverter 332 to one input of gate 334 while line 336 is connected directly to the other input of gate 334. An output on line 338 from gate 334 indicates that the quantity A – B = 10, thus, indicating that the tape drive should be stopped. This signal is applied to gate 340 to prevent any drive signal, either forward or reverse, from reaching outputs 316 and 318. In the absence of a signal on line 338, a drive signal, either forward or reverse, can be generated as hereinafter described.

A run signal appears on line 342 and is applied to gate 340 to generate either a forward or reverse signal in accordance with the command from the control unit 30 of FIG. 1. The output of gate 340 is connected commonly to inverting AND gates 344 and 346 in the forward and reverse drive lines, respectively, the second input of gate 344 being taken from the 1 output of flip-flop 352, hereinafter described to represent a drive tape forward condition and another input to gate 346 being taken from the 0 or complemented output of flip-flop 352 to represent the drive tape reverse condition. Neither gate 344 or 346 can produce an output until the machine control unit is ready; this is indicated by an output from the 1 output terminal of flip-flop 348. The 1 input of flip-flop 348 is connected to receive either the $\overline{RDC}$ or $\overline{FDC}$ inhibit signals by way of OR gate 350.

The output of gate 344 is connected to the drive tape forward output line 316 through the OR gate 352 and the output of gate 346 is connected to the drive tape reverse output line through OR gate 354.

The run signal to gate 340 is generated by the combination of the flip-flops 353 and 360 of which flip-flop 353 has the 1 and 0 inputs connected to receive the RDC and FDC signals from the control circuit of FIG. 8. Gate 355 receives the FDC signal and the 1 output of flip-flop 353 whereas gate 356 receives the RDC signal and the 0 output of flip-flop 353. The outputs of the two gates 355 and 356 are OR'd in gate 358, the output of which is connected to flip-flop 360. The 0 input of flip-flop 360 is also connected to receive a signal from AND gate 362 whenever the OR outputs of adder 320 indicate that the A counter address is equal to the B counter address. These signals are applied to the gate 362 through inverters 264. Thus, when the direction of tape movement is reversed, tape must be read back until A = B according to the usual comparison of the two most significant bits and further until the read operation is in the proper section to satisfy normal requirements.

The output of OR gate 358 is connected to the input of an inverter 366 and the OR'd in gate 368 with the output of run signal gate 340. The output of gate 368 is connected through AND gate 370 to a one-shot multivibrator 372 having an RC timing circuit 374 to produce an output on line 376 of fixed duration whenever a stop signal condition exists. The output on line 376 is applied through both gates 352 and 354 to the output line 316 and 318, thus, turning on both forward and reverse drive signals whenever the tape drive is to be stopped. This effects a dynamic braking condition which has been found to be highly effective in drawing the tape transport drive motor to a quick stop, thus, limiting tape read overshoot without the need for more sophisticated and expensive equipment.

It is to be understood that the invention has been described with reference to a specific and illustrative embodiment thereof and, accordingly, the foregoing description is not to be construed in a limiting sense. It is to be understood that the term tape as used in this specification is not intended to be limited to a continuous punched Mylar or paper tape, but may be construed more broadly to include any of various sequentially-reading, active storage media, such as punched cards, magnetic tape, and the like.

The embodiments of the invention in which an exclusive property or privilege is claimed are defined as follows:

1. A system for reading numerical control characters from a tape in which said characters are stored in serially arranged blocks into a numerical control device which calls for and receives said characters a block at a time, said system comprising: input means for reading characters from tape, a transport mechanism for causing displacement of said tape relative to said input means when actuated, a cyclically operable, addressable, buffer memory of finite length connected to receive and store signals representing characters from the input means, said memory being arranged into a plurality of sections, each section being capable of storing a relatively large number of characters, said memory being further arranged to store said character signals in a serial and cyclical fashion whereby the storage of characters progresses from the first location of the first section to the last storage location of the last section in the memory and then back to the first location, output means for reading characters from the memory and outputting said characters to a numerical control device a block at a time and according to the same sequence in which the characters are stored in the memory via said input means, said output means being actuable by said device substantially independently of said input means; and control means for actuating the transport mechanism to write characters into the memory whenever the position of a character read from memory is less than at least one full section behind the last character written into the memory via the input means.

2. Apparatus as defined in claim 1 wherein the control means includes a first counter for indicating the address of the last character written into memory and a second counter for indicating the address of the last character read from the memory.

3. Apparatus as defined in claim 2 wherein said addresses in the first and second counters correspond in number and form to the addresses by which said buffer memory is accessed, and circuit means connected between said counters and said memory for gating the address contents from said counters into said memory during respective writing and reading operations.

4. Apparatus as defined in claim 2 including comparison means for comparing at least a portion of the address in the first counter to a corresponding portion of the address in the second counter, and means for producing an actuation signal for application to said transport mechanism in response to the results of the comparison between said address portions.

5. Apparatus as defined in claim 4 wherein said memory is divided effectively into a plurality of sections, each having an exclusive address, said addresses and said comparison means being arranged such that the transport mechanism actuation signal causes said transport mechanism to read additional tape into said memory for all comparison between said first and second counter addresses, except one.

6. Apparatus as defined in claim 1 wherein said tape comprises a plurality of data channels and a sprocket channel, the increments of said sprocket channel indicating increments of displacement of the tape relative to the transport mechanism, said input means including sprocket read apparatus for producing a pair of similar, but phase-shifted, waveforms upon displacement of the tape relative to the input means.

7. Apparatus as defined in claim 6 including circuit means for detecting the absence of a sprocket signal, and means connecting said circuit means to said transport mechanism to inhibit operation of said mechanism upon failure of a sprocket signal.

8. Apparatus as defined in claim 1 wherein said control means further includes means for producing incremental signals indicating displacement of said tape relative to said transport mechanism during the writing of data into said memory, and means connecting said signals to said first counter to advance the address count in said counter according to the number of characters read from tape.

9. Apparatus as defined in claim 8 including circuit means for producing signals upon reading of characters from said memory, and means for connecting said signal to the second counter for incrementing the address of said second counter as characters are read from memory.

10. Apparatus as defined in claim 1 including means connected between said output means and a numerical control utilization device for simulating a sprocket signal upon reading of characters from memory.

11. Apparatus as defined in claim 3 wherein said tape comprises eight data channels, said memory having eight data storage channels each capable of receiving for storage a predetermined plurality of character bits, the first counter being connected to each of the memory channels for advancing the address in which character bits are stored such that the same address is accessed at any given time for any given character in all of the memory channels.

12. Apparatus as defined in claim 1 including latch means connected between the memory and the output means for holding a character during a read operation, and clock means connected to said latch means for transferring a character out of said latch means a predetermined increment of time after receipt of same.

13. Apparatus as defined in claim 9 including multiplexer means for selectively connecting the first and second counters to the memory for transfer of respective write and read operation addresses thereto.

14. Apparatus as defined in claim 1 wherein said control means further includes means for producing a forward run signal during the writing of progressively fresh characters from tape into memory, means for producing a reverse run upon command from the numerical control instrumentality receiving data, and dynamic braking means for simultaneously applying both of said forward and reverse run signals to the transport mechanism during a transport stop operation.

* * * * *